United States Patent [19]

Carra et al.

[11] Patent Number: 5,174,405
[45] Date of Patent: Dec. 29, 1992

[54] SELF-TRAVELING ROBOTIC VEHICLE WITH INCLINABLE PROPULSION UNITS

[75] Inventors: Olivier Carra, Peyrins; Alain Delevallee, Ecully, both of France

[73] Assignee: Framatone, France

[21] Appl. No.: 575,083

[22] Filed: Aug. 30, 1990

[30] Foreign Application Priority Data

Aug. 31, 1989 [FR] France .............. 89 11465

[51] Int. Cl.⁵ .............. B62D 55/075; B62D 55/0841
[52] U.S. Cl. .............. 180/9.32; 180/8.7; 180/9.46; 180/9.5
[58] Field of Search ............ 180/6.2, 8.2, 8.7, 9.1, 180/9.3, 9.32, 9.44, 9.46, 9.5, 9.52, 9.62, 9.64, 10

[56] References Cited

U.S. PATENT DOCUMENTS

| 2,682,927 | 7/1954 | Leveke | 180/9.5 |
| 3,382,943 | 5/1968 | Anderson | 180/9.1 |
| 3,609,804 | 10/1971 | Morrison | 180/9.32 |
| 4,702,331 | 10/1987 | Hagihara et al. | 180/9.32 |
| 4,977,971 | 12/1990 | Crane, III et al. | 180/9.32 |

FOREIGN PATENT DOCUMENTS

| 1197800 | 6/1959 | France . |
| 2190087 | 1/1974 | France . |
| 2523914 | 9/1983 | France . |
| 2529157 | 12/1983 | France . |
| 203483 | 8/1988 | Japan | 180/8.2 |

Primary Examiner—Mitchell J. Hill
Attorney, Agent, or Firm—Pollock, Vand Sande & Priddy

[57] ABSTRACT

The invention concerns a vehicle (1) with inclinable tracks in which an inclination movement of a propulsion unit (3) about its articulation axis (5) is assisted by reverse propulsion movement of the track (4) of the propulsion unit.

The invention is applicable to the nuclear industry in particular.

7 Claims, 8 Drawing Sheets

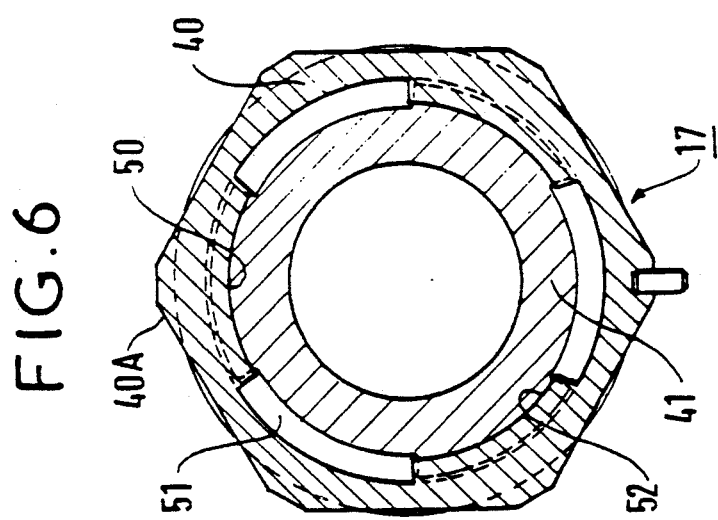
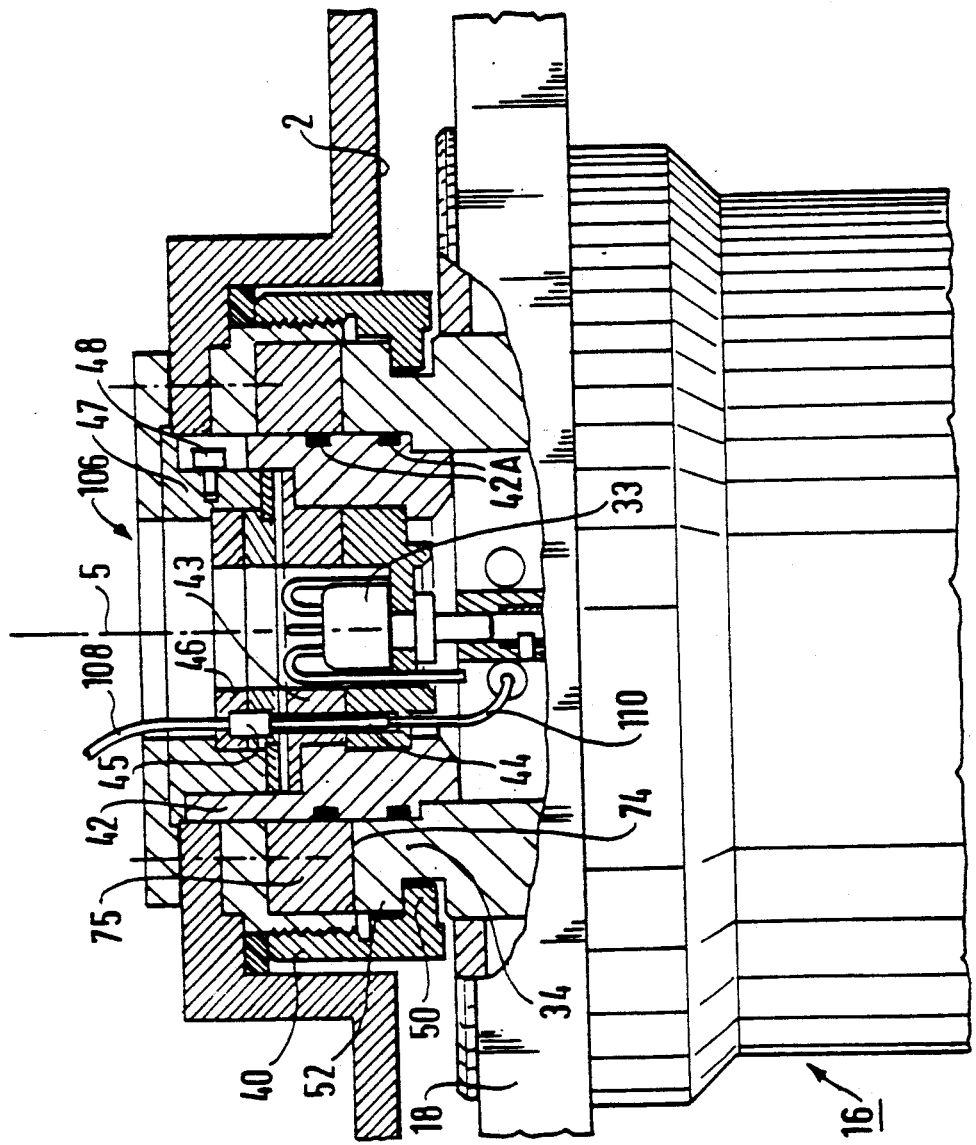

SELF-TRAVELING ROBOTIC VEHICLE WITH INCLINABLE PROPULSION UNITS

The present invention concerns a vehicle with tracks mounted on inclinable propulsion units.

It finds particular applications in industrial installations where action is required that would be dangerous or impossible for a human operative. A vehicle in accordance with the present invention can be used in such circumstances. To this end it may be fitted with appropriate instruments such as tools, measuring instruments, video cameras, etc and automatic systems whereby it constitutes a robot.

A robot in accordance with the present invention will be found particularly useful in a nuclear power station or in a nuclear fuel reprocessing plant when repairs or inspections have to be carried out following certain operating incidents in areas where the level of ionising radiation is high. Robots of this kind can be equally useful in other industries, however, for example in the chemicals industry where there is a risk of explosion, and in security and site surveillance applications.

An important parameter of a vehicle of this kind is its ability to get past obstacles. The obstacles concerned may be of very diverse forms, for example a staircase designed for human use that the vehicle has to climb or descend, or a pipe fallen onto a floor, or a narrow corridor. There are two main factors contributing to how securely such vehicles can get past such obstacles. One is the stability of the vehicle, that is to say its ability to avoid falling over under its own weight and that of its load. The other is the traction provided by the propulsion units of the vehicle, by which is meant the members which rest on the ground to support and move or immobilise the vehicle. This traction is the ability of the propulsion unit not to slip or skid unduly in contact with the ground, the term "ground" being used here to refer to any surface on which the propulsion unit may rest.

Various vehicles have been designed to get past obstacles of this kind securely. A first vehicle is known from ACEC's European patent EP 197 020 which describes a remote guided or remote controlled vehicle constituting a robot for inspection and action in hostile environments. The robot has a drive system, i.e. drive and braking means, integrated into a main chassis constituting a vehicle body. It also has means for transmitting motion from this drive system to tracks which are carried outside the chassis by guide members fixed to the chassis. This robot is provided with two auxiliary chassis, one at the front and one at the rear, on each of which are mounted lefthand and righthand tracks. Each auxiliary chassis can be inclined relative to the main chassis by command action from the latter. If the robot encounters an obstacle in front of it which is of moderate height, the height being substantially constant in the transverse direction, it can climb over it, keeping the main chassis in a virtually horizontal position. On the other hand, if it encounters an obstacle in front of it where the height changes quickly in the transverse direction, it risks tipping onto its side on crossing it.

A third known vehicle comprises four track-laying propulsion units that can be inclined relative to the body of the vehicle. The track of each propulsion unit is guided by a number of guide members, including two sprocket wheels, one of which is a drive sprocket wheel for driving the track. These members are carried by a swing-arm which constitutes the structure of the propulsion unit and which is assembled to the body of the vehicle in such a way that it can be inclined about a transverse axis. The body of the vehicle carries propulsion drive and inclination drive systems incorporating motors for driving the drive sprocket wheels through mechanical transmission systems and for driving the inclination movements of the swing-arms. These systems also include brakes for controlling these movements. The body of the vehicle also carries electrical power supply batteries and control means for the drive system.

This third vehicle is the MRV (Multifunctional Robot Vehicle) proposed by the Japanese company Mitsubishi and described on pages 425 and 426 of the report of the conference "85 ICAR International Conference on Advanced Robotics, Sept. 9-10, 1985, Tokyo, Japan, organised by: Robotics Society of Japan, The Society of Biomechanisms, Japan Industrial Robot Association". It would seem to be able to get past obstacles of known shape and its average speed of advance would seem to be possibly greater than that of the second known vehicle previously mentioned. It is of great mechanical complexity, however, which would seem to introduce the risk of failures in service. When the use of a vehicle of this kind is required it is often extremely desirable for the work in question to be done quickly, which means either providing a second vehicle to take over immediately from the first should it fail or providing for human intervention in dangerous conditions requiring precautions the cost of which might be very high. These obligations are therefore costly. What is more, the overall size of the drive systems housed in the body of the vehicle limits the space available for the electrical batteries, which limits the operating time of the vehicle or, should a longer operating time be needed, requires the vehicle to be fitted with an electrical power supply cable to connect it to a fixed source of electrical power.

SUMMARY OF THE INVENTION

A particular object of the present invention is to make it possible to reduce the overall size, the weight and the overall cost of the propulsion and inclination drive systems of a vehicle of this kind. Another object of the invention is to benefit from this reduction in overall size to increase the time for which the vehicle can operate without the batteries being replaced or recharged by accomodating a larger battery in the space made available in the body of the vehicle.

Another object of the invention is to benefit from this reduction in overall size to integrate at least part of the drive systems into the propulsion units of the vehicle. To be of practical utility, this integration requires the drive systems to be sufficiently powerful and to be suitable for mounting in a simple way in the limited space available inside the propulsion unit, in spite of the complexity of a system of this kind which typically comprises an electric motor, a mechanical gearbox and an electrically-operated brake. It does have various advantages, however:

It is no longer necessary to provide mechanical transmission means between the vehicle body and the propulsion unit, just electrical transmission means.

Although the most likely failures preventing use of the vehicle concern the mechanical parts, that is the subsystems incorporating moving parts, all of these parts are integrated into the readily removable and interchangeable propulsion units, with the result that such failure can easily be remedied by replacing just the propulsion unit concerned, the only precondition being the availability of a spare propulsion unit, the cost of which is much lower than that of the entire vehicle. What is more, in the case of a typical remote controlled vehicle with four propulsion units, should one propulsion unit of the vehicle fail in an area inaccessible to men, for example because it is highly contaminated with radioactivity, it is possible to return the vehicle to an area which is accessible to men using the three propulsion units which remain operational. Usually it is even possible to achieve this without the faulty propulsion unit dragging on the ground. This is done by inclining the three operational propulsion units whilst reducing as much as possible the inclination of the faulty propulsion unit. Once the vehicle has reached the area accessible to men the failed propulsion unit is replaced and the vehicle is operational again.

The body of the vehicle and the propulsion units can be transported and stored independently, facilitating logistics.

A further object of the invention is to make the vehicle more sure-footed when it has to get past obstacles which entail inclination of the propulsion units.

In accordance with this invention these objects can be achieved in a vehicle with inclinable tracks in which an inclination movement of a propulsion unit is assisted by a propulsion movement of the track of the propulsion unit in a rotation direction opposite to that of the inclination movement.

This propulsion movement of the track can have several advantageous effects which depend on the speed of this movement and on a neutral speed as defined hereinafter. To be more precise, these effects depend on a differential speed which is equal to the speed of this movement less said neutral speed and which is positive or negative according to whether the speed of this movement is greater than or less than the neutral speed.

The neutral speed is the speed that the track should have relative to the propulsion unit during the inclination movement for the track to rest on the ground without slipping, that is to say so that the absolute speed of the track at its point of contact with the ground is zero. This neutral speed is proportional to the speed of the inclination movement and depends also on the position at which the track bears on the ground relative to the articulation axis of the propulsion unit if the body of the vehicle has no horizontal movement.

A first advantageous effect is to eliminate the friction forces that would otherwise be operative between the ground and the track if the latter had no propulsion movement. Given that the tracks are designed to cling to the ground as much as possible (they are made from rubber, for example, and fitted with crampons), such forces are high and would considerably impede the inclination movement. They would therefore make it essential to use powerful inclination drive means.

A second advantageous effect is seen when the inclination movement in progress is a raising movement which tends to lower the point at which the track bears on the ground relative to the body of the vehicle, in other words to raise the body of the vehicle against its own weight. The speed of propulsion movement of the track must be greater than the neutral speed or equal to it but tends to be greater than it because of the torque applied by the propulsion drive (positive or zero differential speed). This effect assists the inclination in that the force applied to the track by the propulsion drive tends to assist the inclination movement of the propulsion unit. It therefore reduces the torque that the inclination drive has to apply to bring about the required lifting inclination movement. It therefore makes it possible to reduce the power of this drive and therefore its overall size and/or weight and/or cost.

A third advantageous effect is a traction effect which is seen mainly when the differential speed achieved is zero or very small. It increases the maximum force assisting the inclination that can be applied in the context of the second effect as described above by a sufficiently powerful propulsion drive. This results from the well known fact that the maximum values of the tangential friction forces that can be exerted between two bodies bearing on each other are greatest, for the same normal bearing force, if there is no relative slipping between the two bodies.

With reference to the appended diagrammatic drawings a description will now be given of how the present invention may be put into practice, it being understood that the components and arrangements described and shown are so described and shown by way of non-limiting example only. If the same part is shown in more than one figure it always has the same reference symbol.

BRIEF DESCRIPTION OF THE DRAWINGS

The figures show:

FIG. 5: plan view in cross-section of the means for assembling the swing-arm of the propulsion unit to the body of the vehicle, FIG. 6: front view in cross-section of the coupling members of the assembly means.

DESCRIPTION OF THE PREFERRED EMBODIMENT

Figure 1:
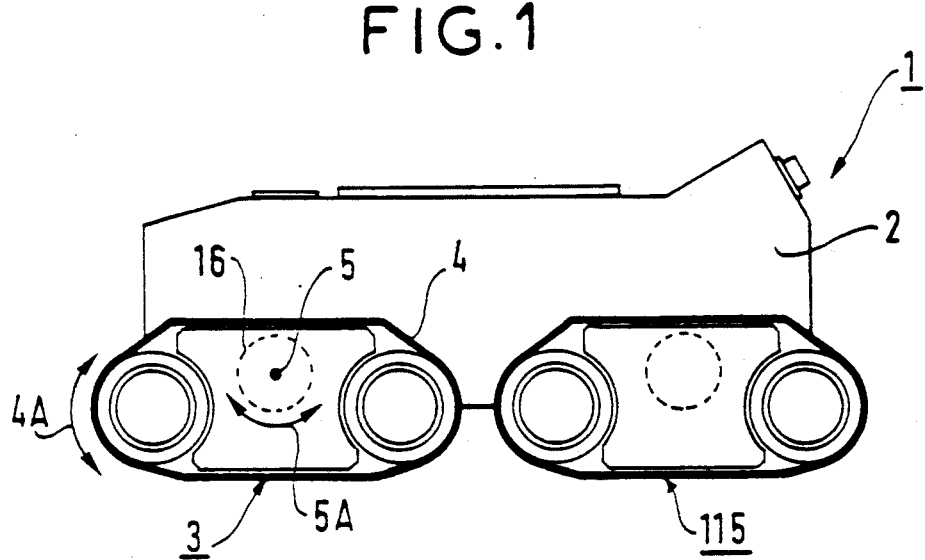
FIG. 1: side view of a first vehicle in accordance with the present invention.
Figure 2:
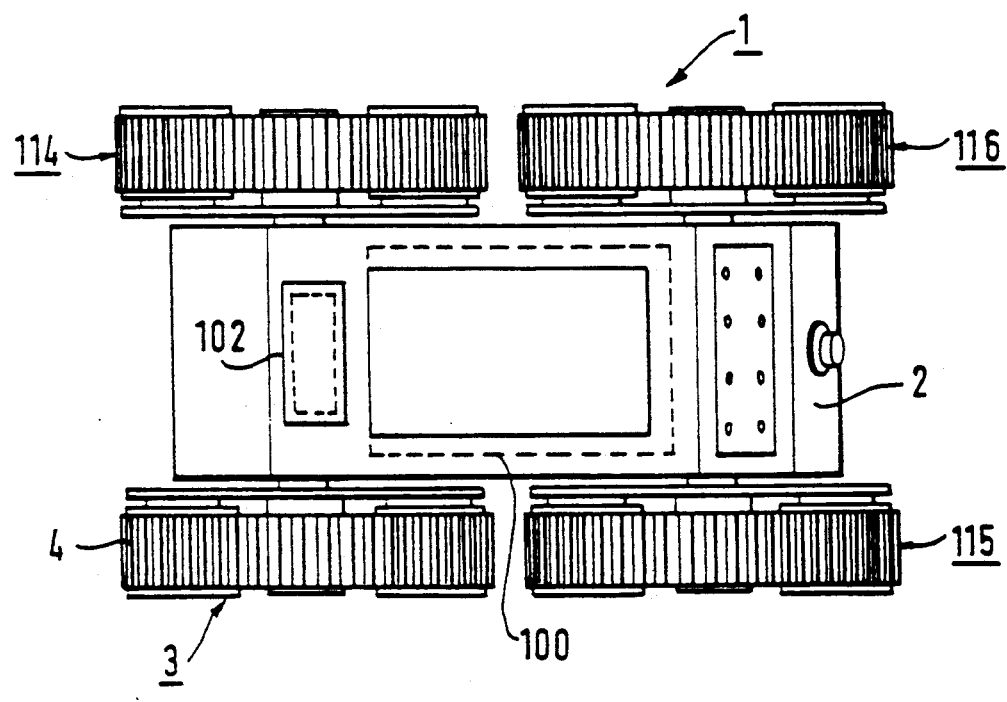
FIG. 2: plan view of this vehicle.

There will first be described various preferred features of the present invention. These features are all applied in the first vehicle in accordance with the invention mentioned above, except where otherwise indicated, but it should be understood that other vehicles in accordance with this invention could embody only some of these preferred features, as is the case with the second vehicle in accordance with the invention mentioned above.

One of these features is common to the two vehicles in accordance with the present invention and to the third prior art vehicle (MRV) previously mentioned. Reference should now be had to FIGS. 1 through 5.

By virtue of this common feature, the vehicle comprises:

a vehicle body 2, four propulsion units 3 assembled to said vehicle body to support and propel said vehicle, each propulsion unit being of generally elongate shape with a longitudinal axis 12 and comprising:

a track 4 resting on the ground and driven in a closed loop (for example completely around the propulsion unit) in a plane containing the aforementioned longitudinal axis to move the propulsion unit relative to the ground, track guide members, 6, 7, 9 and 10 to guide said movement of said track, a rotatable drive sprocket wheel 6 which drives said track so as to bring about said propulsion action, a swing-arm 18 carrying said guide members and said sprocket wheel 6, means for assembling the swing-arm 18 to said vehicle body 2 and comprising an articulation 16 enabling inclination of the swing-arm relative to the body by rotation about a transverse articulation axis 5, propulsion drive systems 22, 23, and propulsion brakes 21 each corresponding to one of said propulsion units for driving or limiting the rotation of said drive sprocket wheel 6 of that propulsion unit, inclination drive systems 38, 37 and inclination brakes 36A each corresponding to one of said propulsion units for driving or braking inclination movement of said swing-arm of that propulsion unit, power supply means 100, and control means 102, 13 supplying control signals to said propulsion and inclination drive systems so as to coordinate the support and propulsion actions of said propulsion units, some at least of these control means being central control means 102 carried by said vehicle body to supply coordination signals to said propulsion unit.

Some features are common to the two vehicles in accordance with the present invention:

The vehicle comprises four propulsion units: front right 114, front left 3, rear right 116 and rear left 115, said track 4 of each propulsion unit being symmetrical to a median transverse vertical plane 118 (FIG. 3) passing through said articulation axis 5, said front right and rear right propulsion units being symmetrical to said front left and rear left propulsion units.

The vehicle comprises inclination assistance means 130 which operate whenever said inclination drive means 38, 37 corresponding to one propulsion unit 3 are commanded to cause an inclination movement having a rotation direction, the inclination assistance means then operating to rotate said drive sprocket wheel 6 corresponding to this propulsion unit in the rotation direction opposite that of the inclination movement of the swing-arm of this propulsion unit.

Said inclination assistance means 130 operate to rotate said drive sprocket wheel 6 at a speed at least equal to a neutral speed that would avoid any slipping of said track 5 relative to the ground during said inclination movement.

One feature common to said third known vehicle and to said first vehicle in accordance with the present invention is that said inclination drive means 38, 37 comprise inclination motors 30A controlled by said central control means 102 to drive said inclination movements, said inclination drive means and said inclination brake 36A corresponding to the same propulsion unit constituting an inclination drive system corresponding to that propulsion unit. Said propulsion drive means comprise a propulsion drive which constitutes in combination with said propulsion brake a propulsion drive system.

Figure 7:
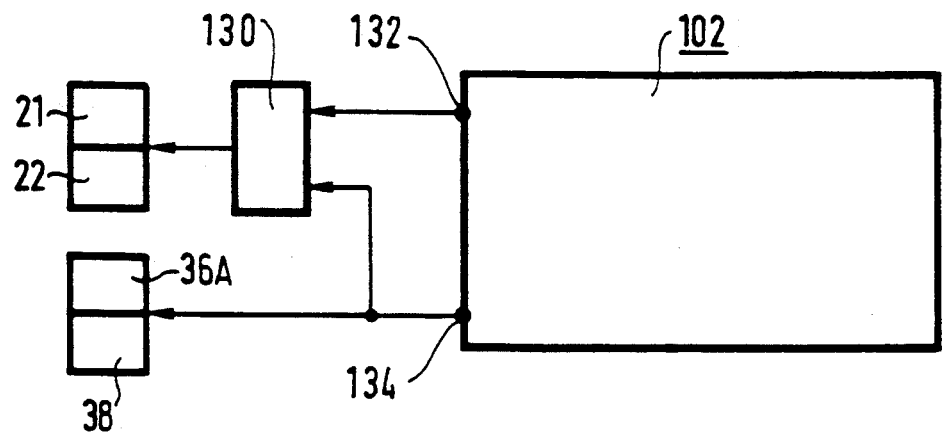
FIG. 7: detail view of the central control means of this vehicle, in the form of a block diagram.

Other features apply only to said first vehicle in accordance with the present invention:

said control means 102, 13 comprise, in corresponding relationship to each propulsion unit 3:

a propulsion output 132 (see FIG. 7) adapted to supply a propulsion control signal, an inclination output 134 adapted to provide an inclination control signal, and an inclination assistance circuit 130 adapted to receive said inclination control signal and to respond thereto by providing an inclination assistance signal that is optionally combined with said propulsion control signal, this circuit constituting part of said inclination assistance means.. These control means can essentially be carried in each propulsion unit. However, to coordinate the movements of the various propulsion units they incorporate coordination means which are carried by the body of the vehicle and which are referred to hereinafter as the central control means 102. They could equally well be carried entirely by the body of the vehicle, however.

Said vehicle further comprises in corresponding relationship to each of said propulsion units means 108, 110, 43, 44, 45, 46 for transmitting said propulsion control and inclination assistance signals to said propulsion drive 22, 23 and said inclination control signal to said inclination drive 38, 37. If a propulsion unit has to perform an inclination movement in response to an inclination control signal while the vehicle body is moving horizontally, which is accomplished by a speed of movement of the propulsion unit in response to a propulsion control signal, the inclination assistance circuit 130 combines the propulsion control and inclination assistance signals so that the speed at which the track moves is the sum of this propulsion motion speed and an inclination assistance speed intended to assist the inclination drive. It must be understood, however, that the inclination assistance would be limited or eliminated if it had disadvantages.

Said inclination assistance circuit 130 provides said inclination assistance signal in the form of a speed control signal requiring said propulsion drive 22, 23 to drive said drive sprocket wheel 6 at an inclination assistance speed determined by said control means 102. This speed, expressed in metres per second, can then be equal to the product of a propulsion unit inclination speed expressed in radians per second by a propulsion unit bearing radius expressed in metres, this radius being predeterminable and possibly equal to a maximum bearing radius equal to the greatest possible distance between a point at which the track 4 rests on the ground and the articulation axis 5 of the swing-arm 18.

In an alternative arrangement to this, said inclination assistance circuit 130 provides said inclination assistance signal in the form of a torque control signal requiring said propulsion drive 22, 23 to apply to said drive sprocket wheel 6 a torque determined by said control means 102, 13. This torque is determined to avoid any risk of the track slipping on the ground, this alternative arrangement having the advantage of improving the traction of the propulsion unit.

Said propulsion drive systems 22, 23, 21 and inclination drive systems 38, 37, 36A corresponding to a propulsion unit 3 are mounted on said swing-arm 18 of the propulsion unit, said swing-arm assembly means comprising, in addition to said articulation 16, a removable fixing device 17 enabling easy and repeated removal of the swing-arm from and assembly of the swing-arm to said vehicle body 2.

The vehicle further comprises, in corresponding relationship to each of said propulsion units, transmission means 108, 110, 44, 45 for transmitting at least said coordination signals between said central control means 102 carried by said vehicle body 2 and said propulsion unit, the transmission means comprising deformable elements 110 to withstand said inclination movements and separable complementary connectors 44, 45 to enable these means to function again after temporary removal of the swing-arm. The drive systems are mounted on the swing-arm in such a way that the assembly means and the inclination drive system carry, guide and drive the swing-arm and the latter carries and guides the drive sprocket wheel together with the propulsion drive system which drives this sprocket wheel. Each of the drive systems comprises, for example, an electric motor, a mechanical gearbox and an electrically-operated brake, although the gearbox and the brake could be implemented in some other way and/or at some other location. The deformable members of the transmission means are flexible wires, for example.

Said power supply means 100 are carried by said vehicle body 2, said transmission means 108, 110, 43, 44, 45, 46 being also adapted to transmit to said propulsion drive systems 22, 23, 21 and inclination drive systems 38, 37, 36A the power that they need. These power supply means are electric batteries, for example. The fact that the body of the vehicle does not need to house the drive systems means that a large battery can be accommodated in it to increase the time for which the vehicle can operate without replacing or recharging the battery.

Each propulsion unit 3 is substantially contained within a flat volume circumscribed by said generally strip form track 4, the surface area and thickness of this flat volume being respectively dependent on the loop length and the width of the track 4.

Said swing-arm 18 is a generally plate-like member, said vehicle body 2 being on the inside of this plate and said guide members 6, 7, 9, 10, drive sprocket wheel 6 and drive systems 22, 23, 21, 38, 37, 36A being on the outside of this plate.

Said swing-arm articulation 16 comprises:
a tubular articulation hub 34 coaxial with said articulation axis 5 and forming a central volume at least the greater part of which is on the outside of said swing-arm 18 between an open outside end and an inside end facing said vehicle body 2, this inside end constituting part of an articulation conduit 106 extending along this axis,
an articulation cage 39 surrounding said articulation hub coaxially and carrying said swing-arm 18, and
ball bearings 39A and 39B for guiding rotation of said articulation cage about said articulation hub.

Said articulation fixing device 17 is tubular in shape and extends coaxially in line with said articulation hub to complete said articulation conduit.

Said transmission means comprise:
central transmission means 108 coupled to said vehicle body 2,
peripheral transmission means 110 coupled to said swing-arm 18, and
transmission coupling means 44, 45 extending through said articulation conduit 106 and located near said articulation fixing device to connect said peripheral transmission means in a readily removable way to said central transmission means.

Said articulation device 17 comprises two coaxial tubular couplings, a male coupling 41 and a female coupling 40 of which one is mounted on said inner end of the articulation hub 34 and the other is mounted on said vehicle body 2, said female coupling 40 comprising ribs 50 which project radially inwards and which are distributed circumferentially around said articulation axis 5 with gaps between them, said male coupling 41 comprising ribs 52 which project radially outwards and which are distributed circumferentially around said articulation axis leaving gaps between them, so that an assembly operation can be carried out firstly by coaxial penetration of said male coupling into said female coupling with said ribs on each coupling passing through said gaps in the other, and then by an assembly rotation during which one of the couplings turns relative to the other through an assembly rotation angle about said articulation axis 5 until the ribs of each coupling are brought into angular coincidence with those of the other to prevent extraction of said male coupling, removal being accomplished by means of the converse operations.

One of said two tubular couplings (40) is rotatably mounted so that said assembly rotation operation affects only this coupling. Unwanted rotation is prevented in a known way by friction or snap-fastener means. The assembly operation is performed by means of a thin open-end wrench that is inserted into the narrow gap between the swing-arm 18 and the wall of the vehicle body 2 facing it.

Said transmission coupling means comprise two electrical connectors of which one (43) is carried by said articulation hub 34 and the other (46) is carried by said vehicle body 2, the electrical connectors facing each other and being coaxial with said articulation axis 5. Each of these electrical connectors 43 carries contacts 44 distributed circumferentially around this axis and adapted to cooperate with complementary contacts 45 carried by the other connector to enable transmission of said control signals.

At least part of said inclination drive system 38, 37, 36A is disposed coaxially within said central volume of the articulation hub 34, this system bearing on the hub and also, passing through said open outer end of the hub, on said articulation cage 39, so as to drive or brake rotation of the cage relative to the hub.

Said drive sprocket wheel 6 is equipped with:
a transverse tubular drive hub 19 forming a central volume between an inner end fixed to said swing-arm 18 and an open outer end, and
bearings 26, 26A which guide rotation of this sprocket wheel about the hub.

At least part of said propulsion drive system 22, 23, 21 is disposed coaxially within said central volume of the drive hub 34, this system bearing on the hub and, through said outer end of the hub, on said drive sprocket wheel to drive or brake rotation of this sprocket wheel relative to the hub.

Said track guide members 6, 7, 9, 10 comprise two toothed sprocket wheels located at the longitudinally opposite ends of said propulsion unit 3 and the teeth in which cooperate with teeth in said track 4, one of these sprocket wheels constituting said drive sprocket wheel 6 and the other being a freely rotatable end guide sprocket wheel 7 equipped with a transverse tubular guide hub 27 forming a central volume between an internal end fixed to said swing-arm 18 and an open outer end, a propulsion motion sensor 15 being disposed in said central volume of said guide hub and coupled to the hub and to the sprocket wheel, passing through said outer end of the hub, to supply a propulsion motion measurement signal representative of the rotation of this sprocket wheel relative to the hub.

Said propulsion unit further comprises an inclination transmission rod 70 extending along said articulation axis 5 from an outer end fixed to said articulation cage 39 through said open outer end of said articulation hub 34 to an inner end situated in said articulation conduit 106, and an inclination sensor 33 fixed between said inner end of said inclination transmission rod and said articulation hub 34 to supply an inclination measurement signal representative of the inclination of said swing-arm 18, said inclination drive systems 38, 37, 36A surrounding said inclination transmission rod.

The components of the first vehicle in accordance with the present invention that are shown in the figures will now be described in more detail.

Referring to FIG. 1, a vehicle 1 is essentially formed by a vehicle body constituting a support structure 2 on which are mounted four propulsion units such as the propulsion unit 3 designed to drive the vehicle through the intermediary of toothed tracks such as the track 4 which can be driven in either direction as shown by an arrow 4A. These propulsion units comprise swing-arms mounted to pivot independently about articulation axes such as the articulation axis 5 as shown by an arrow 5A. As the profile and the movements of each propulsion unit are effectively those of its swing-arm, information relating to a propulsion unit will on occasion hereinafter be given with reference only to the swing-arm. The support structure 2 is a box adapted to contain batteries 100 (see figure 2) constituting power supply means which supply the power needed for the vehicle to function. This box also contains electrical radio receiver means, electrical voltage generation means and central control means 102 controlling the transmission of the voltages supplied by the generation means. The battery capacity is high, which gives the robot based on the vehicle a very long operating time. Operating instructions are transmitted to the vehicle by radio and the progress of the camera-equipped vehicle is monitored on a control screen in a protected area accessible to men.

The vehicle is equipped with devices well known to those skilled in this art such as a charge monitoring device, an inclinometer, a mobile arm on which tools can be mounted and test and/or recording means.

Figure 3:
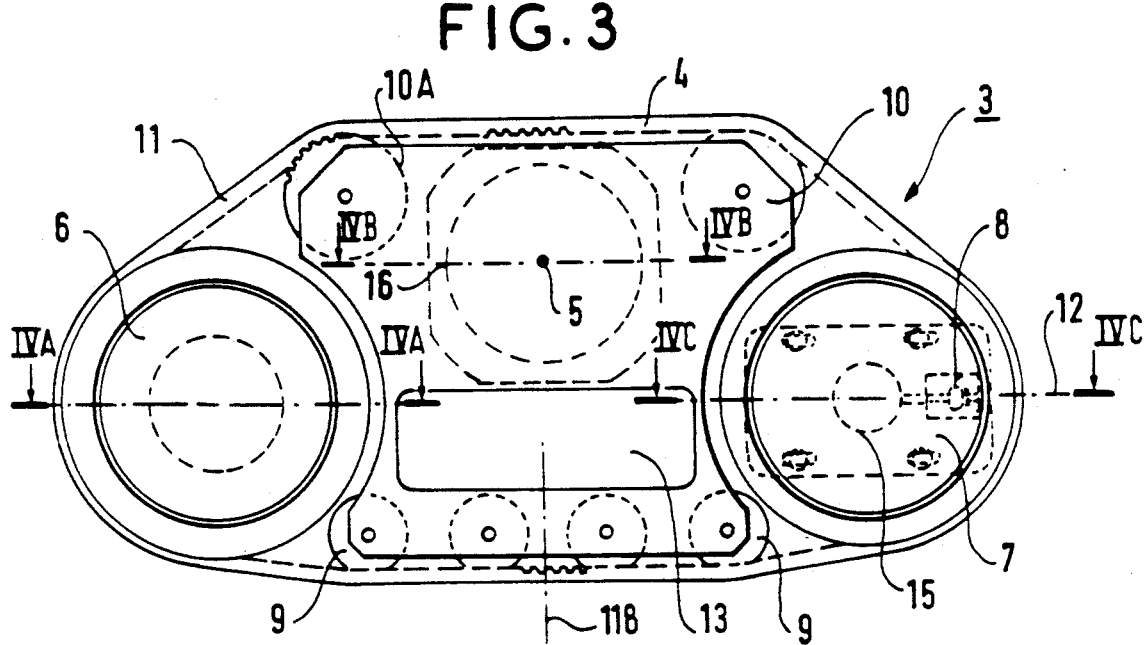
FIG. 3: front view of a propulsion unit of this vehicle.

Referring to FIG. 3, the toothed track 4 is driven by the drive sprocket wheel 6 around the swing-arm 3. It is guided by the end guide sprocket wheel 7 equipped with an encoder 15 and a tensioning system 8 for tensioning it. At the base of the swing-arm, in a horizontal plane, are four small sprocket wheels 9 to guide the track.

The upper part of the toothed track is guided by two other sprocket wheels 10 and 10A. The outside generatrices of all these sprocket wheels define the overall dimensions of the propulsion unit. Covers 11 fixed to the sprocket wheels secure the toothed track onto the propulsion unit in the lateral direction.

Whether operating or stopped, each propulsion unit can rotate about the articulation axis 5 so that a longitudinal axis 12 of the propulsion unit is horizontal in the normal supporting position and can be inclined so that the propulsion unit is supported on the track 4 at the drive sprocket wheel end or at the guide sprocket wheel end. A readily accessible housing is provided in the propulsion unit to accommodate an electronics module 13 constituting part of said control means and supplying and controlling the drive systems included in the propulsion unit.

Figure 4:
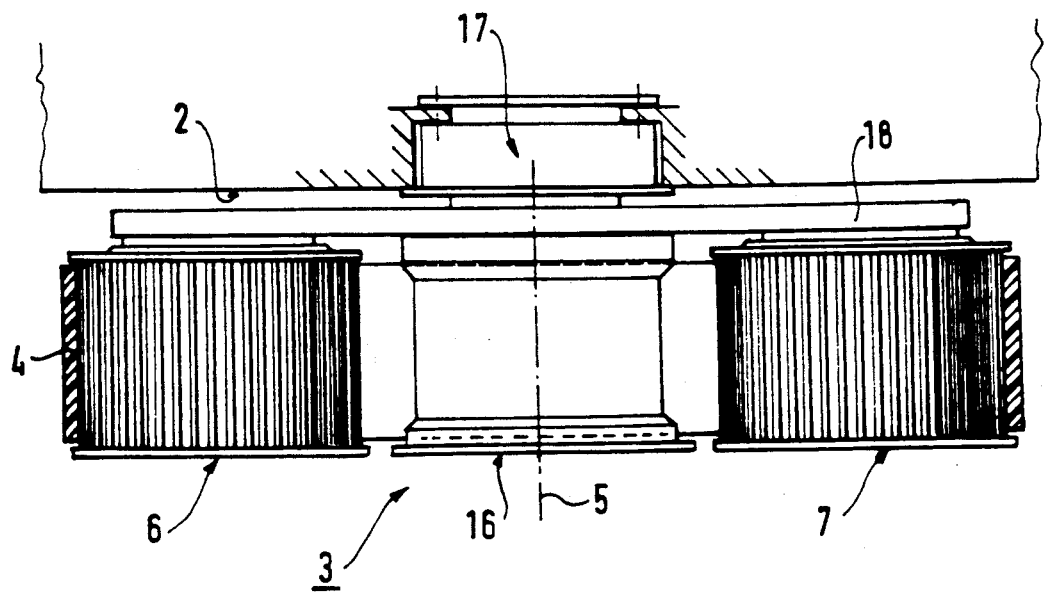
FIG. 4: plan view of this propulsion unit with the track and some guide sprocket wheels removed to show a drive sprocket wheel, an articulation and an end guide sprocket wheel.

FIG. 4 is a plan view of a propulsion unit 3 in cross-section. The swing-arm essentially comprises a plate-like member 18 on which are mounted the drive sprocket wheel 6, the end guide sprocket wheel 7 and the articulation 16 provided with a device 17 for fixing it to the support structure 2.

Figure 4A:
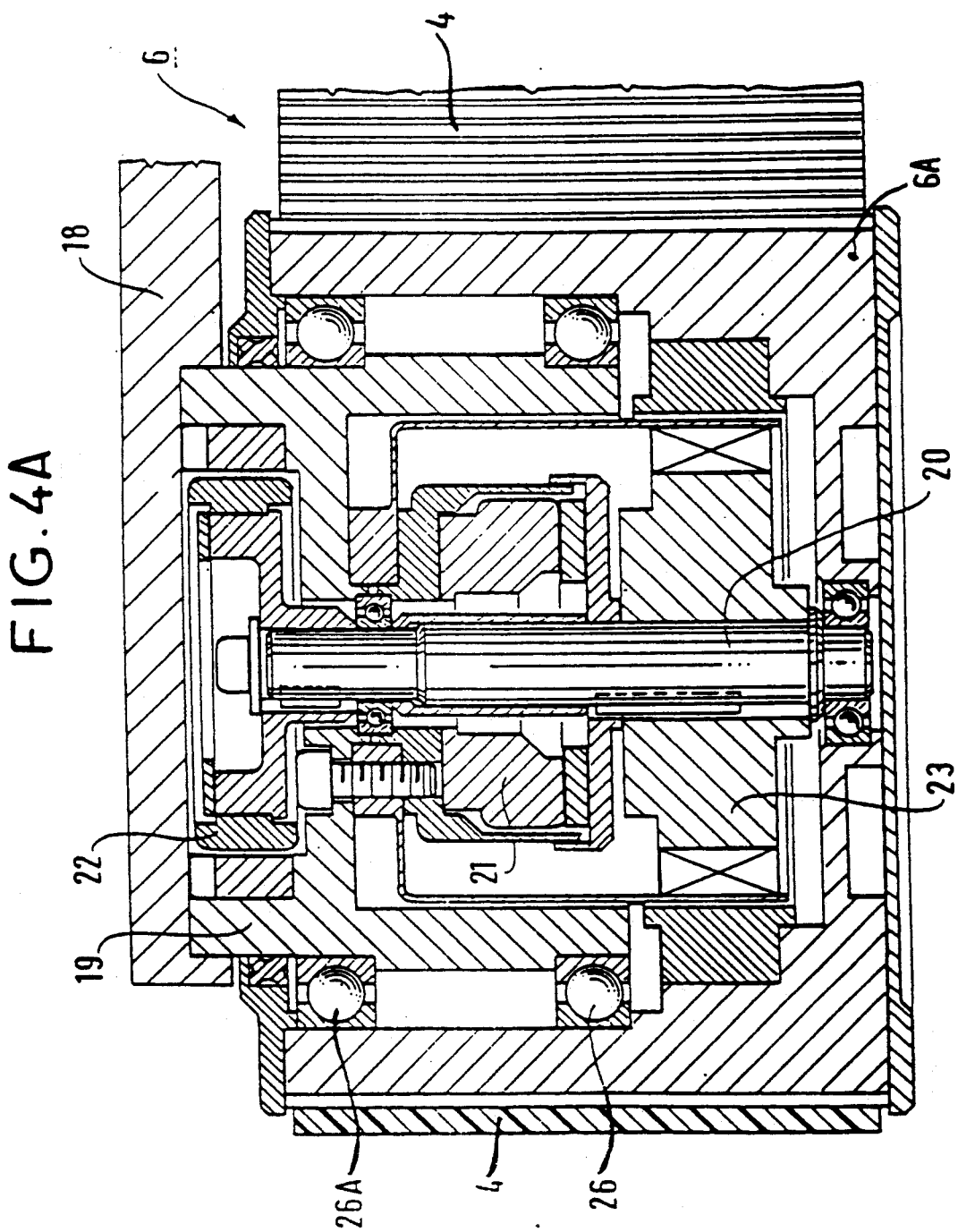
FIGS. 4A, 4B, 4C: plan views in diametral cross-section to an enlarged scale of the drive sprocket wheel, the articulation and the guide sprocket wheel.

Referring to FIG. 4A, the drive sprocket wheel 6 comprises a hub 19 constituting said drive hub and fixed to the swing-arm 18. Mounted inside the hub 19 is a rotating shaft 20 on which are mounted a brake 21, a motor 22 and a gearbox 23 coupled to the rotating shaft 20 and to the toothed sprocket wheel 6A which constitutes the active part of the system formed by the drive sprocket wheel 6 and which drives the track 4 which is provided to this end with corresponding teeth. Ball bearings 26 and 26A guide rotation of the toothed sprocket wheel on the hub.

Figure 4B:
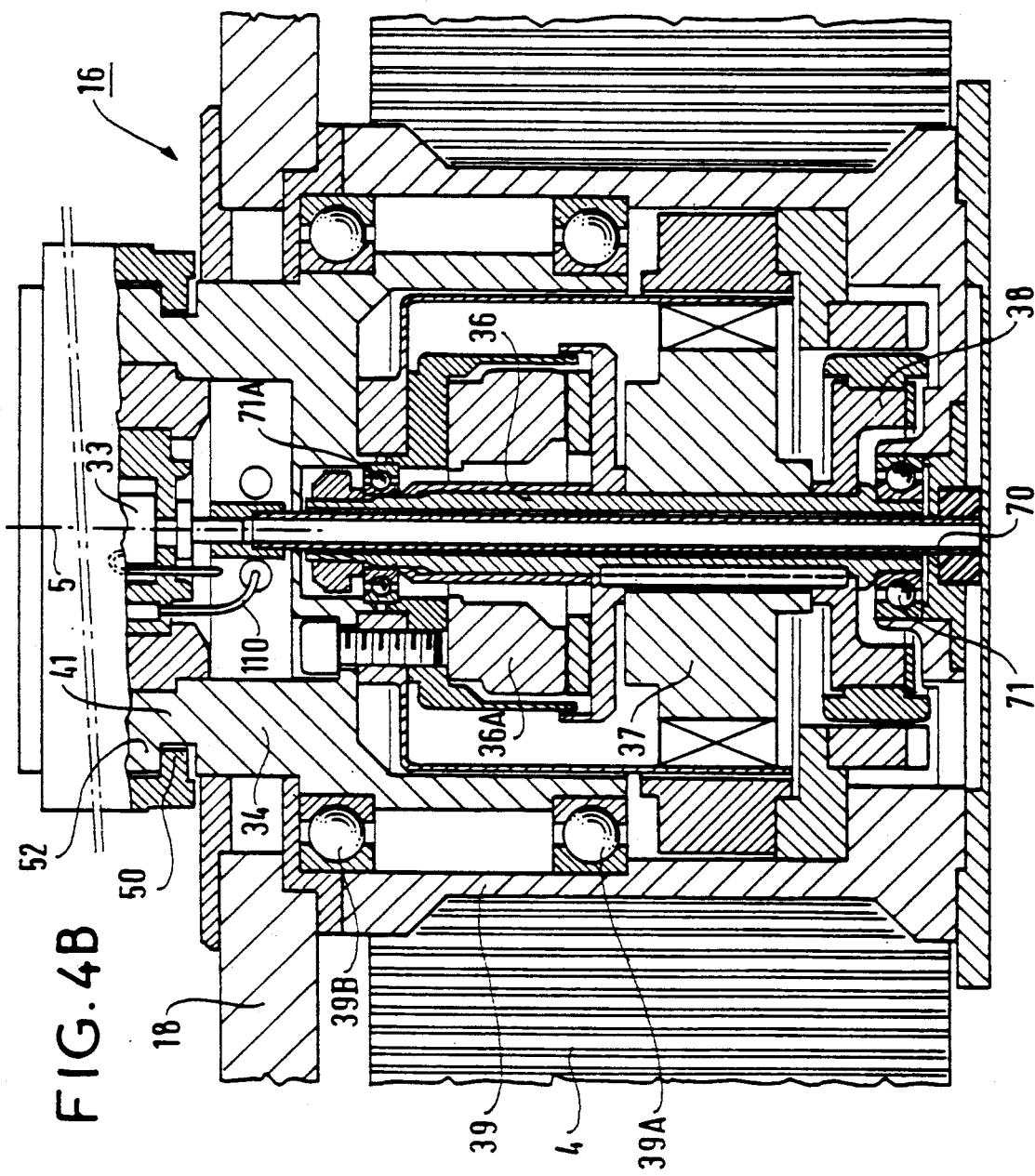
Figure 4C:
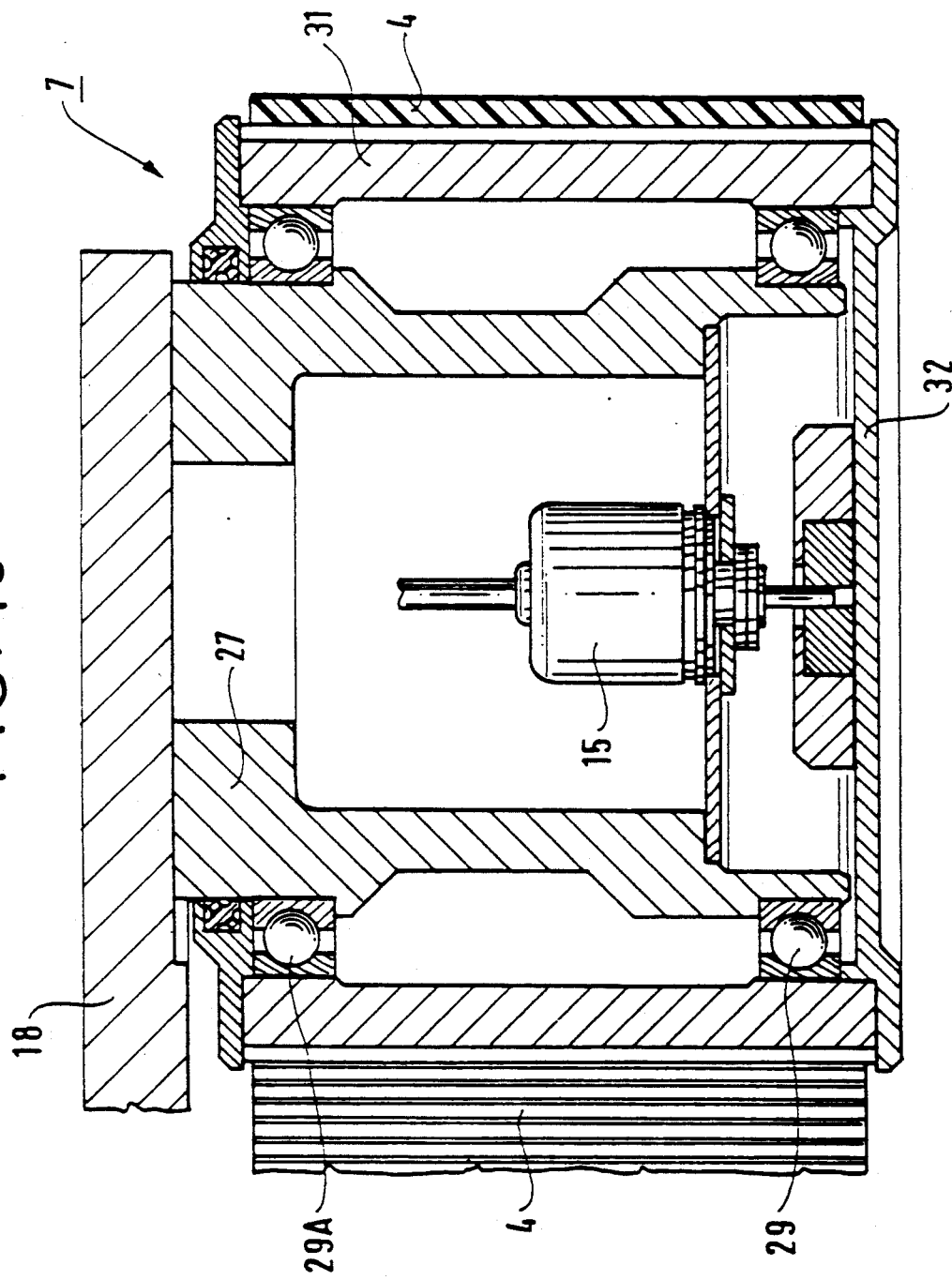

Referring to FIG. 4C, the end guide sprocket wheel 7 includes a tubular hub 27 which is fixed to the swing-arm 18 and in the central volume of which is mounted the propulsion motion sensor 15. Bearings 29 and 29A fixed to the outside of the hub 27 guide rotation of the sprocket wheel 7 when driven by the track 4. A cover 32 is fixed to the sprocket wheel 7 and coupled to the shaft of the sensor 15.

Referring to FIG. 4B, the articulation 16 comprises an articulation hub 34 comprising at its inner end means for fixing it to the support structure 2, to be described with reference to FIG. 6. The hub carries inside its central volume a tubular shaft 36 on which is mounted a brake 36A. Also fixed to the tubular shaft 36 is a gearbox 37 which reduces the rotation speed of the swing-arm to a value very much less than that of the inclination drive 38; the gearbox 37 is coupled to the drive 38 through the tubular shaft 36 mounted on ball bearings 71 and 71A. Ball bearings 39A and 39B guide rotation of the articulation cage 39 about the hub 34. The cage 39 is screwed to the swing-arm 18.

An inclination transmission tube 70 is located inside the tubular shaft 36. One end of this tube is used to attach the inclination sensor 33 which gives at all times an indication of the inclination of the swing-arm relative to the body of the vehicle.

FIG. 5 is a view in cross-section of the device enabling the swing-arm 18 to be assembled rapidly to the vehicle body 2. A female coupling 40 is mounted on this body by means of a set of auxiliary parts enabling rotation of the coupling relative to the body for the previously mentioned assembly rotation. The male coupling 41 is machined into the inner end of the hub 34 which projects from the inside of the swing-arm 18 so that it can be nested within the lugged female coupling 40. Referring to FIG. 6, the hub 34 is then locked by the female coupling. To this end, during the fitting of the propulsion unit the three rib 52 of the male coupling 41 are lined up with the gaps 51 between the three ribs 50 of the female coupling 40. Following coaxial penetration of the male coupling into the female coupling, a thin open-end wrench is applied to flats 40A formed on the outside surface of the coupling 40 (see FIG. 6) to rotate the coupling 40 through said assembly rotation angle, which is approximately 60°. The conical surfaces of the ribs 50 of the female coupling 40 then cooperate with the conical surfaces of the ribs 52 so as to lock the ribs 50 coupled to the swing-arm against a bearing surface 74 (visible in FIG. 5) of a ring 75 attached to the support structure 2. In this way the propulsion unit is attached to the support structure 2.

Referring again to FIG. 5, a support 42 in the form of a circular bush is screwed into a bore in the hub 34. It carries a cover 43 which constitutes a base for fitting electrical connection socket contacts 44. The complementary plug contacts 45 are fixed to a ring 46 fitted to a support 47 in the form of a circular bush assembled coaxially to the female coupling 40 on the support structure 2. The perimeter on which the contacts are disposed is coaxial with the couplings and carries 22 contacts two of which are polarisers. The mechanical polarisers 48 and electrical polarisers (not shown) ensure that the propulsion unit is oriented correctly when fitted, in order to carry out the mechanical assembly of the swing-arm to the support structure and the electrical connection of the central transmission means such as the wire 108 and peripheral transmision means such as the wire 110. O-ring seals 42A on the support 42 seal this assembly.

The circular support 42 attached to the hub 34 enables centering and guidance of the swing-arm through the intermediary of the ring 75 when fitted to the support structure 2.

Figure 8:
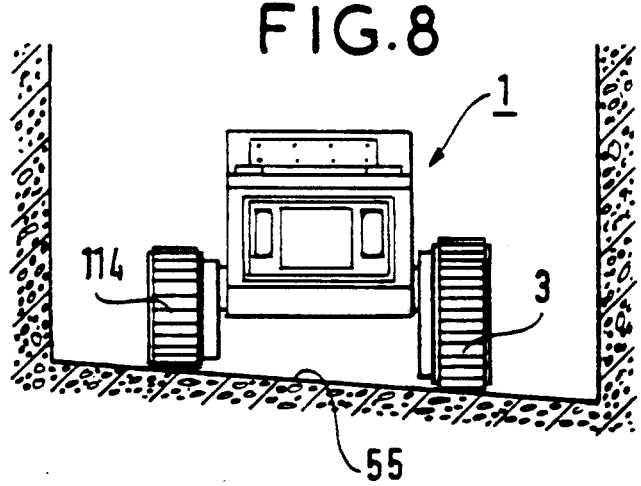
FIG. 8: example of use of the vehicle, seen from in front in a passage with a strong lateral incline.
Figure 9:
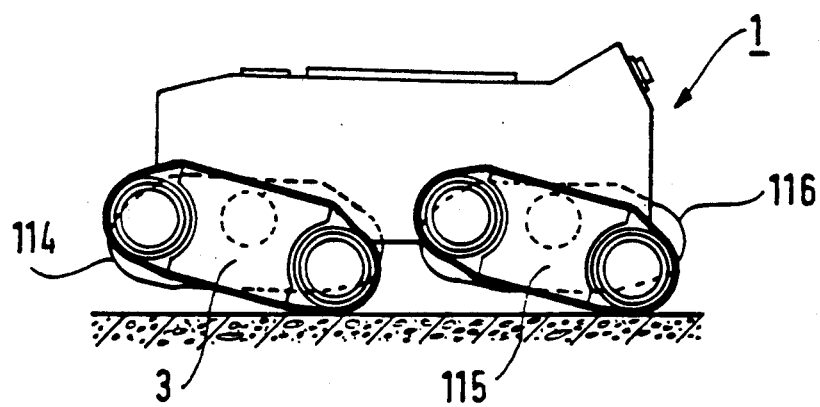
FIG. 9: side view of the vehicle in the passage of FIG. 8, FIG. 10: schematic plan view of the sprocket wheels of a propulsion unit of a second vehicle in accordance with the present invention comprising a single drive in each inclinable track-laying propulsion unit.

FIGS. 8 and 9 show the vehicle 1 moving on an inclined plane 55; the propulsion units such as the propulsion unit 114 which are on the higher part of the inclined plane are in the horizontal position while those such as the propulsion unit 3 which are on the lower part of the inclined plane are in the inclined position. It will be understood that all combinations of inclinations of the propulsion units can be used to allow for the various ground configurations encountered by the vehicle as it moves along.

Figure 10:
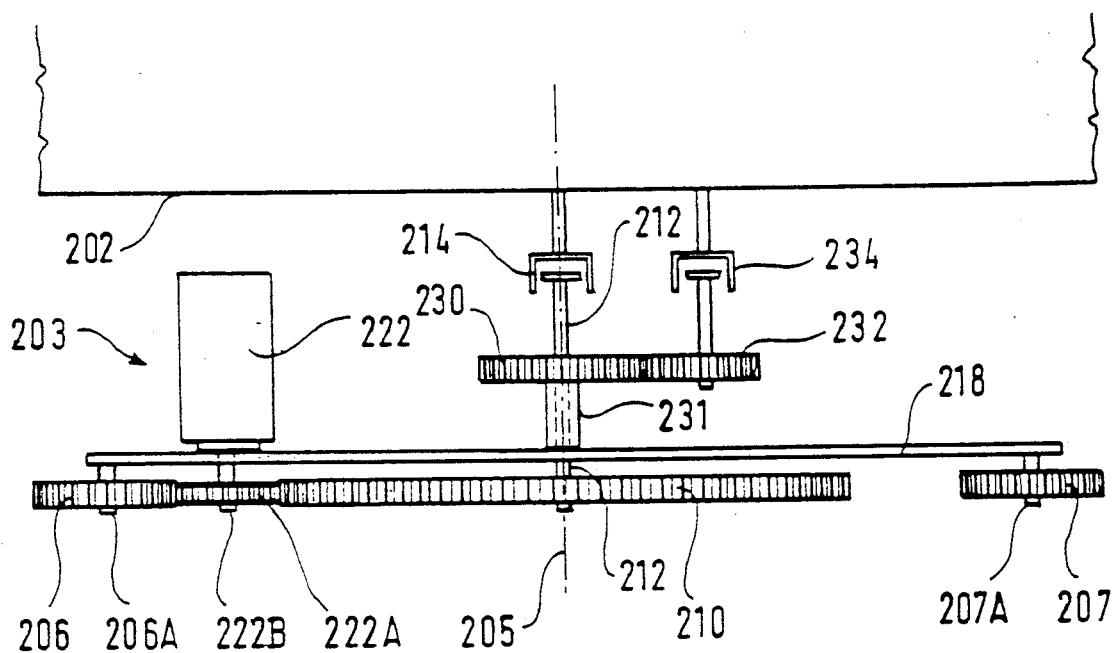
Figure 11:
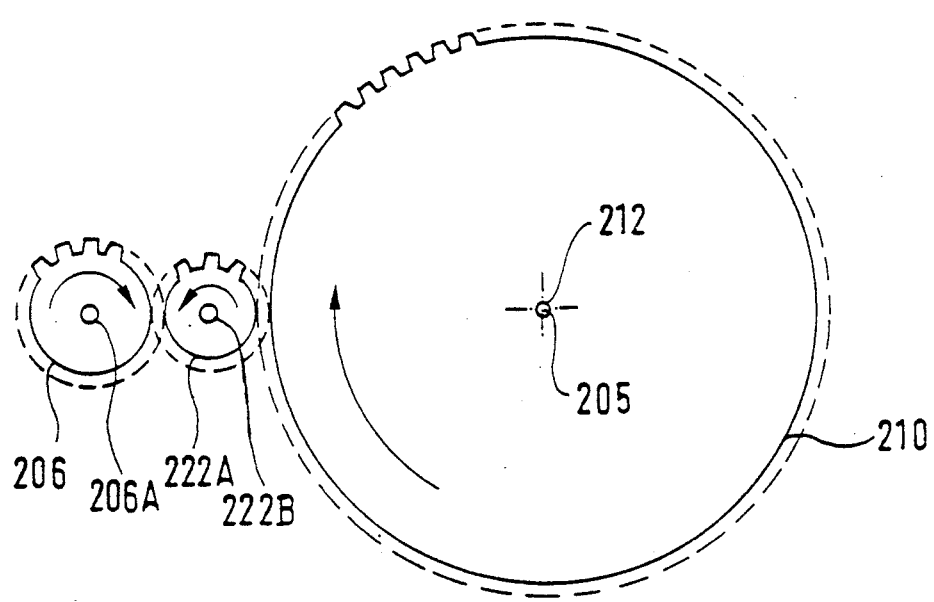
FIG. 11: side view of some of the sprocket wheels from FIG. 10.

FIGS. 10 and 11 show part of the mechanical systems of a propulsion unit of a second vehicle in accordance with the present invention. In this propulsion unit the inclination drive no longer comprises a dedicated motor. The general arrangement of this second vehicle is as follows:

Said inclination drive means 206, 228, 210 produce simultaneously propulsion movement and inclination movement from a propulsion drive 222, the inclination drive means being provided with a selectively operable clutch 214 constituting said inclination assistance means and which is adapted to engage the inclination drive means in response to an inclination control signal, said propulsion drive operating in response to propulsion drive control signals, said central control means (not shown) supplying simultaneously said inclination control signal and said propulsion drive control signal constituting an inclination assistance signal when an inclination movement has to be performed and supplying only a propulsion drive control signal constituting a propulsion control signal when said vehicle must be propelled with no inclination movement.

In more detail, referring to FIG. 10, the second vehicle in accordance with the present invention comprises a vehicle body 202 and four propulsion units of which only one propulsion unit 203 is shown and comprises a swing-arm 218 in the form of a vertical longitudinal plate articulated about a transverse articulation axis 205.

The swing-arm carries sprocket wheel shafts 206A and 207A for a drive sprocket wheel 206 and an end guide sprocket wheel 207 on which is mounted a track (not shown). It carries also a propulsion drive motor 222 driving through a gearbox a primary sprocket wheel 222A rotating about an axis 222B and cooperating with the drive sprocket wheel 206 and with a central sprocket wheel 210 carried like the previous sprocket wheels on the outside of the swing-arm. The central sprocket wheel is fitted with a mechanical shaft 212 which passes through the swing-arm along its geometrical articulation axis 205 to a clutch 214 fixed to the vehicle body 202 so that the mechanical shaft and the central sprocket wheel 210 can be immobilized. The mechanical shaft and the sprocket wheel are free to rotate relative to the swing-arm 218.

A swing-arm sprocket wheel 230 is fixed to the inside of the swing-arm 218 by a hollow shaft 213 and cooperates with a sprocket wheel 232 rotatably mounted on the vehicle body 202 and provided with a clutch 234 which can immobilize it and constitutes an inclination brake. A propulsion brake (not shown) is associated with the motor 222.

Rotation of the motor 222 results in propulsion movement through the sprocket wheels 22A and 206 if the clutch 214 is released to allow the central sprocket wheel 210 to rotate freely and the inclination brake 230, 232, 234 is applied.

If the inclination brake is released and the clutch 214 engaged to lock the central sprocket wheel 210, rotation of the motor 222 drives an inclination movement through engagement of the primary sprocket wheel 222A with the fixed central sprocket wheel 210 and a reverse propulsion movement through the intermediary of the sprocket wheels 222A and 206.

In practise intermediate gears are used to match the rotation speeds of the drive sprocket wheel 206 and the swing-arm 218.

The vehicle in accordance with the present invention has the following advantages:

It can be operated under remote control in a hostile environment for several hours at a time. Its power is supplied by batteries stowed in the support structure which is free of all mechanical parts. The necessary information can be transmitted to it by known transmission means such as are normally used. Its design enables it to move in a liquid such as water because it is entirely watertight. The electronic components are embedded in appropriate materials to protect them when the vehicle moves in highly irradiated areas.

The vehicle can be used in a nuclear power station:
- To carry out routine inspections:
conventional or 3D television inspection,
analysis of the environment including humidity, temperature, radiation, contamination, noise.
To work on the reactor while in operation, for example: as an aid to decision making, for plugging a leak in a pipe,
for adjusting a valve.

For working on a reactor when shut down, for instance following an accident, for example:
to carry out decontamination,
to evacuate highly irradiated equipment,
to install protection materials or screens,
to work in highly irradiated areas, service life.

It can also be used in the chemicals industry, for example:
for patrolling to identify faults,
for monitoring the atmosphere,
for detecting smoke or flames It can also be used in a penitentiary establishment to carry out a surveillance patrol on a predetermined circuit or a circuit modified by an operator to check a specific point The vehicle is first specifically equipped for any such operation, for example with a mobile arm adapted to receive various tools or test devices It can operate automatically and has the capability to return to a fixed point to recharge its batteries as needed.

As the above description shows, this vehicle has numerous advantages. It is quick and simple to maintain because the propulsion units can be removed quickly. The independence of the propulsion units makes it possible to get past difficult obstacles that a conventional type robot could not get past. Its modular design enables it to be adapted to specific circumstances by means of track-laying propulsion units of different sizes.

What is claimed is:

1. A vehicle with inclinable tracks comprising:
   (a) a vehicle body;
   (b) a plurality of propulsion units (3) assembled to said vehicle body to support and propel said vehicle, each propulsion unit having a generally elongate shape with a longitudinal axis (12) and comprising:
      (i) a rack (4) resting on the ground and driven in a closed loop around the propulsion unit in a plane containing said longitudinal axis to move the propulsion unit relative to the ground;
      (ii) track guide members (6, 7, 9, 10) to guide a propulsion movement of said track;
      (iii) a drive sprocket wheel (6) to drive said propulsion movement of said track so as to bring about propulsion;
      (iv) a swing-arm (18) carrying said guide members and said drive sprocket wheel (6);
      (v) securing means for attaching the swing-arm (8) to said vehicle body (2) comprising an articulation (16) enabling inclination of said swing-arm relative to the body by rotation about a transverse articulation axis (5);
      (vi) propulsion drive means (22, 23) and propulsion brakes (21) corresponding to said propulsion units for respectively driving and limiting the rotation of said drive sprocket wheel (6) of said propulsion units;
      (vii) inclination drive means and an inclination brake (38, 37, 222A, 210) corresponding to said propulsion units for respectively driving and braking inclination of said swing-arm of said propulsion units; and
      (viii) control means (102, 13) supplying control signals to said propulsion drive means and inclination drive means and brakes and including central control means (102) carried by said vehicle body to supply coordination signals adapted to coordinate support and propulsion actions of said propulsion units; and,
   (c) said vehicle further comprising inclination assistance means (130) which operate whenever said inclination drive means (38, 37) corresponding to a propulsion unit (3) are commanded to cause an inclination movement of said swing arm having a rotation direction, said inclination assistance means then operating to turn said drive sprocket wheel (6) corresponding to said propulsion unit in a rotation direction opposite to a rotation direction of said inclination of said swing-arm (18) of said propulsion unit.

2. A vehicle according to claim 1 wherein said inclination assistance means (130) is adapted to cause said drive sprocket wheel (6) to turn at a speed at least equal to a neutral speed that would avoid any slipping of said track (4Z) relative to the ground during said inclination movement.

3. A vehicle according to claim 2, wherein said inclination drive means (38, 37) comprise inclination motor (38) controlled by said control means (102, 13) to drive said inclination movement, said inclination drive means and said inclination brake (36A) corresponding to a same propulsion unit constituting an inclination drive system corresponding to said propulsion unit, said propulsion drive means of said propulsion unit comprising a propulsion drive (22, 23) constituting with said propulsion brakes (21) a propulsion drive system (21, 22, 23), said control means (102) comprising, in a relationship corresponding to each propulsion unit (3):
   (a) a propulsion output (132) adapted to supply a propulsion control signal;
   (b) an inclination output (134) adapted to control an inclination supply signal;
   (c) an inclination assistance circuit (130) adapted to receive an inclination control signal and to respond thereto by supplying an inclination assistance signal optionally combined with said propulsion control signal, said inclination assistance circuit constituting part of said inclination assistance means; and
   said vehicle further comprising, in corresponding relationship to each of said propulsion units, means (108, 110, 44, 45) for transmitting said propulsion control and inclination assistance signals to said propulsion drive system (22, 23) and said inclination control signal to said inclination drive means (38, 37).

4. A vehicle according to claim 3 wherein said inclination assistance circuit (130) supplied said inclination assistance signal in the form of a speed control signal requiring said propulsion drive system (22, 23) to drive said drive sprocket wheel (6) at an inclination assistance speed determined by said control means (102).

5. A vehicle according to claim 3 wherein said inclination assistance circuit (130) supplied said inclination assistance signal in the form of a torque control signal requiring said propulsion drive system (22, 23) to apply to said drive sprocket wheel (6) a torque determined by said control means (102).

6. A vehicle according to claim 3, wherein said inclination drive means (222a, 210) are means for driving simultaneously a propulsion movement and an inclination movement by said propulsion drive means (222), said inclination drive means including a selectively operable clutch (214) constituting said inclination assistance means and which is adapted to engage said inclination drive means in response to an inclination control signal, said propulsion drive means operating in response to propulsion drive control signals, a central control means supplying simultaneously an inclination control signal and a propulsion drive control signal constituting an inclination assistance signal when an inclination movement must be performed and supplying only a propulsion drive control signal constituting a propulsion control signal when said vehicle must be propelled without any inclination movement.

7. In a vehicle with inclinable tracks wherein inclination of said tracks (4) are assisted by reverse propulsion movement of said tracks comprising:
   (a) a vehicle body;
   (b) elongated propulsion units for carrying said vehicle body having a longitudinal and a transverse direction, each of said propulsion units comprising:
      (i) a track guided by said propulsion unit in a closed loop in a longitudinal plane of said propulsion unit, a part of said track resting on the ground for carrying said propulsion unit;
      (ii) a propulsion drive means (21, 22) for driving a propulsion movement of said track;
      (iii) a propulsion control means (132) for controlling said propulsion drive means;
      (iv) an articulation (16) for enabling an inclination movement of said propulsion unit relative to said vehicle body about a transverse articulation axis (5) of said propulsion unit;
      (v) an inclination drive means (36a, 38) driving said inclination movement; and
      (vi) an inclination control means (134) for controlling said inclination drive means;
   (c) the improvement wherein said vehicle further comprises inclination assist means (130) controlled by said inclination control means and cooperating with said propulsion control means for said propulsion drive means to drive said track in a rotation direction opposite to said inclination movement.

* * * * *